Patented Feb. 29, 1944

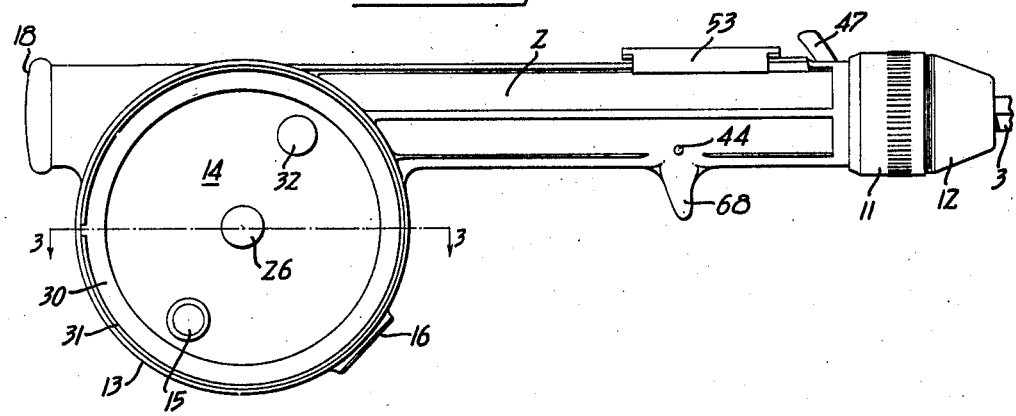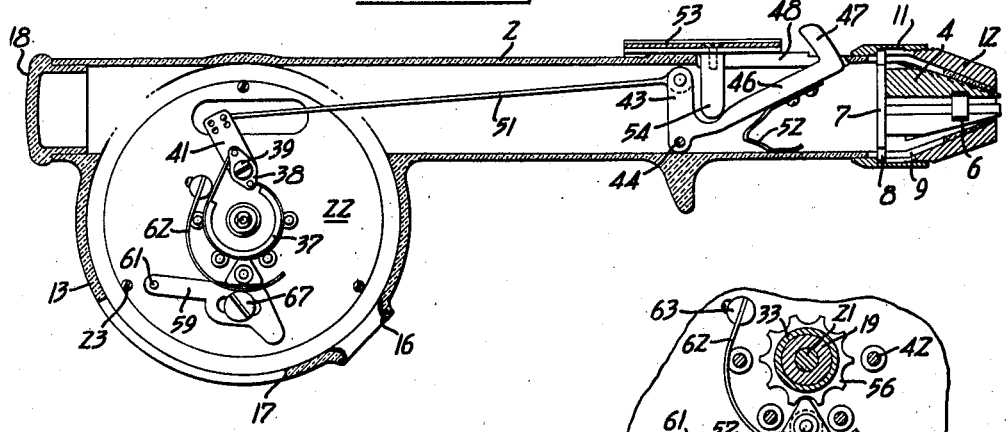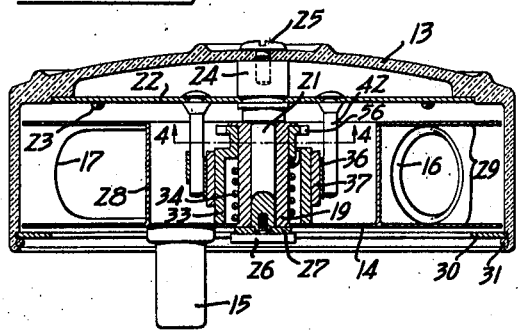

2,342,993

UNITED STATES PATENT OFFICE 2,342,993

FISHING POLE AND REEL

Ralph J. Wright, Berkeley, Calif.

Application August 2, 1940, Serial No. 349,484

1 Claim. (Cl. 43—20)

My invention relates to fishing tackle; and more particularly to improvements in poles and reels.

It is among the objects of my invention to provide a combination pole and reel unit in which the reel comprises a structurally integral part of the pole.

Another object is to provide a reel assembly disposed within a hollow handle portion of the pole.

Still further objects include the provision of improved brake and click mechanisms for the reel.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claim.

Referring to the drawing:

Figure 1 is a side elevational view of a fish pole and reel embodying my invention, the rod portion of the pole being largely omitted to shorten the view.

Figure 2 is a longitudinal vertical sectional view of the pole handle portion, with the spool removed to show the brake and click mechanisms; and Figure 3 is a sectional view taken in a plane indicated by line 3—3 of Figure 1.

Figure 4 is a detail sectional view illustrating the click mechanism on larger scale, taken in a plane indicated by line 4—4 of Figure 3.

In terms of broad inclusion, the fishing tackle of my invention comprises a reel having a spool, and means for applying a selected resistance to the spool in one direction of rotation only. A clicking device is also preferably provided for operation in only one direction of spool rotation. The reel assembly is preferably disposed within a hollow handle portion of a fish pole, with the spool journaled on an axis extending transversely of the pole. Improved means are also provided for connecting portions of the pole together.

In greater detail, and referring particularly to Figure 1 of the drawing, my fishing tackle comprises a pole having a handle portion 2 and a rod portion 3. The latter is preferably of split bamboo construction, and is releasably held by a chuck comprising wedge-shaped jaws 4 within a tapered socket in the end of the handle. The jaws are spread by a spring band 6 and are urged forwardly into clamping engagement with the rod by a plate 7 having ears 8 extending through a slot 9 in the handle and caught by the rim of a ring 11. The latter ring is moved forwardly by relative turning movement between it and a threadably engaged ring 12 having an inside taper seated on the tapered end of the handle. This chuck provides a simple and effective means for joining the handle and rod portions of the pole.

Referring also to Figures 2 and 3, handle portion 2 is of tubular shape to provide a grip and also has an enlarged hollow part 13 adjacent the butt to provide a casing for spool 14 of the reel. The handle portion thus described may be made of any suitable material, but is preferably cast of a moldable composition product. Spool 14 is thus disposed within the hollow handle portion, on an axis extending tranversely of the pole. One side of spool casing 13 is closed and the other side is open to expose knob 15 mounted on the spool. A ring 16 in an opening on the periphery of the spool casing forms a guide for the line, and another aperture 17 at the bottom of the spool casing provides an opening for threading the line and for discharge of water and foreign matter carried by the line when reeling in. An end plug 18 closes the tubular portion of the handle.

Spool 14 has a cylindrical hub 19 journaled on an axle 21 mounted at one end on a plate 22 secured by screws 23 at the closed side of casing 13. An extension 24 of the axle provides a spacer between plate 22 and the casing wall and is secured to the latter by a screw 25. A screw 26 at the other end of the axle and overlying a washer 27 surrounding a reduced end of the axle holds the spool against axial movement. The spool is formed with a core 28 spaced from hub 19 and with flanges 29 terminating adjacent the inner periphery of casing 13. A peripheral ring 30 is disposed in the open end of the casing outside the spool flange, and is held by a spring retaining ring 31. The spool is balanced by a weight 32 disposed diametrically opposite knob 15.

Means are provided for applying a selected resistance to the spool in one direction of rotation only, for retarding the spool as the line runs out but leaving the spool free for reeling in at all times. For this purpose a brake drum 33 is journaled on spool hub 19 with an annular space provided between them for a helical clutch spring 34 secured at one end to the drum and having convolutions wrapped snugly about the hub. This clutch spring is so coiled that counterclockwise rotation of the spool (as viewed in Figure 1) causes the clutch spring to be engaged by wrapping more tightly about the hub and establish a driving connection between the spool and brake drum; while clockwise rotation of the spool causes the clutch spring to unwrap and disengage the spool from the brake drum. By this one-way clutch arrangement the spool is connected for rotation with the brake drum when the line is running out, and is disengaged from the drum to free the spool when reeling in. It is understood of course that other suitable one-way clutches may be employed for accomplishing this function, although the helical spring type is preferred because of its compactness.

A brake band 36 with a suitable lining 37 is disposed about the drum, and is engaged and disengaged by having its ends connected to a couple 38 mounted on a stud 39 and actuated by a lever 41. A series of pins 42 projecting from plate 22 retain the brake band about the drum. The brake is controlled by a lever having an arm 43 pivoted on a pin 44 within handle portion 2 ahead of the spool, and having an angularly disposed arm 46 extending forwardly and terminating in a button 47 projecting through a slot 48 at the top of the handle. Arm 43 is connected with brake lever 41 by a rod 51 having an outturned end engaging a hole in the brake lever, there being several of these holes to provide for adjustment. A leaf spring 52 under arm 46 urges button 47 upwardly and tends to hold the brake band disengaged.

In order to hold the brake engaged at a selected degree of retarding resistance, a slide 53 is mounted on handle 2 with a depending finger 54 engaged with inclined arm 46 to hold the latter down in a selected position to establish a desired tension in the brake band. Thus the operator may apply the brake by depressing button 47 with his thumb, or by moving slide 53 forward to set the brake. The latter feature is important for maintaining a predetermined tension in the line while playing a fish.

At any time, whether the brake is set or not, the spool is free of the brake when reeling in, due to the action of the one-way clutch. Therefore, the line may be taken up by the reel without interference by the brake, yet the instant a fish starts running out with the line the brake, if set, comes into action to maintain the predetermined tension in the line. For casting purposes the brake is merely disengaged to release the spool for free counterclockwise rotation. Light retarding force may be applied at this time to prevent backlashing by easy thumb pressure on button 47, and the cast may be stopped at any time by pressing down hard on the knob. If desired, a light retarding force may be maintained on the spool during a cast by lightly setting the brake, thus positively preventing backlashing without "thumbing" the brake.

Means operatble in one direction only of the spool is also provided for making a clicking sound when the line is running out but not when reeling in. For this purpose a toothed wheel 56 is formed as an integral part of brake drum 33, so that the wheel turns with the spool in a counterclockwise direction only by the action of the one-way clutch. The clicking device comprises a triangularly-shaped element 57 turnably mounted on a pin 58 carried by an arm 59 pivoted on plate 22 by a pin 61.

One point of element 57 is held engaged with toothed wheel 56 by an arcute leaf spring 60 secured at one end to a post 63 on plate 22 and shaped to normally bear against the other two points of element 57, as shown in Figure 4. As wheel 56 rotates (counterclockwise only), element 57 oscillates through an arc of a few degrees due to its wheel engaging point riding over the teeth of the wheel. During this oscillation of element 57 one of its back points presses the spring outwardly, and the clicking sound is made by the spring slapping back against the element as the spring moves alternately between one and two point contact with the element.

Due to the turning movement of clicking element 56 there is little wear in the device. What little wear there is largely occurs at the point which engages wheel 56, and if wear should show at this point the element may be turned around to engage one of the other points with the wheel.

Means are further provided for moving the clicking device into and out of operative position, so the click may be eliminated for purposes of casting or for any other reason. To this end, and referring again to Figure 4, a shaft 62 extends through plate 22 and the side wall of casing 13 and carries a suitable lever 65 at the outer side of the case. The inner end of shaft 62 lies flush with the inner surface of plate 22 and carries an eccentrically disposed pin 64 extending through arm slot 66 and terminating in a head 67. See Figure 2.

By this arrangement, the act of throwing lever 65 from one position to another causes eccentric pin 64 to turn arm 59 about its pivot 61 and move the element 57 into or out of engagement with wheel 56. Figure 4 shows the clicking device in operative position, and Figure 2 shows it in retracted position. Slot 66 is somewhat wider than the diameter of pin 64 to give sufficient clearance for the slight oscillation of arm 59 that occurs when element 57 rides over the teeth of wheel 56.

In the use of my improved pole the handle portion 2 is gripped by the hand of the user in such fashion that the thumb is adjacent the brake control button, this being the natural position of the thumb when the handle is gripped either by the right hand when casting or by the left hand when reeling in. A projection 68 formed on the underside of the handle is arranged to lie between the fingers to give a better grip. At any time when it is desired to remove the spool for replacing the line or for cleaning, it is only necessary to remove screw 26 and rings 30 and 31, whereupon the spool may be slipped off the axle.

I claim:

In a fish pole, a handle comprising a reel case and a tubular hand grip opening into the case, a spool journaled in the case on an axis extending transversely of the pole, a brake for the spool, operating means for the brake disposed in said hand grip and including a lever terminating in a control button projecting through a wall of said grip, and a slide on the hand grip and having a portion projecting into the grip for engagement with said lever for setting the brake.

RALPH J. WRIGHT.